(12) United States Patent
Mildner et al.

(10) Patent No.: US 9,296,429 B2
(45) Date of Patent: Mar. 29, 2016

(54) LONGITUDINAL FRAME FOR THE CHASSIS STRUCTURE OF A MOTOR VEHICLE

(71) Applicant: GM GLOBAL TECHNOLOGY OPERATIONS LLC, Detroit, MI (US)

(72) Inventors: Udo Mildner, Limburg (DE); Karsten Bohle, Bad Schwalbach (DE); Stanislaw Klimek, Frankfurt/Main (DE)

(73) Assignee: GM GLOBAL TECHNOLOGY OPERATINONS LLC, Detroit, MI (US)

( * ) Notice: Subject to any disclaimer, the term of this patent is extended or adjusted under 35 U.S.C. 154(b) by 0 days.

(21) Appl. No.: 13/668,139

(22) Filed: Nov. 2, 2012

(65) Prior Publication Data

US 2013/0113238 A1     May 9, 2013

(30) Foreign Application Priority Data

Nov. 4, 2011 (DE) .......................... 10 2011 117 682

(51) Int. Cl.
     *B62D 21/02*          (2006.01)
     *B62D 25/08*          (2006.01)
     *B62D 25/20*          (2006.01)

(52) U.S. Cl.
     CPC .......... *B62D 25/082* (2013.01); *B62D 25/2018* (2013.01); *B62D 25/20* (2013.01)

(58) Field of Classification Search
     CPC ....................................................... B62D 25/20
     USPC ................... 296/193.07, 204, 187.08, 203.03
     See application file for complete search history.

(56) References Cited

U.S. PATENT DOCUMENTS

| 2,788,223 A | * | 4/1957 | Mersheimer et al. ......... 280/800 |
| 3,252,211 A | | 5/1966 | Lindstrom |
| 5,332,281 A | | 7/1994 | Janotik et al. |
| 5,476,303 A | | 12/1995 | Sakamoto et al. |

(Continued)

FOREIGN PATENT DOCUMENTS

| DE | 4438717 A1 | 5/1996 |
| DE | 19651627 A1 | 6/1998 |
| DE | 102006052381 A1 | 5/2008 |
| DE | 602005005679 T2 | 4/2009 |
| DE | 202009011632 U1 | 2/2010 |

(Continued)

OTHER PUBLICATIONS

German Patent Office, German Search Report dated Jun. 18, 2012 for German Application No. 10 2011 117 682.2.

*Primary Examiner* — Glenn Dayoan
*Assistant Examiner* — Melissa A Black
(74) *Attorney, Agent, or Firm* — Ingrassia Fisher & Lorenz PC

(57) ABSTRACT

A longitudinal frame for the chassis structure of a motor vehicle is provided. The frame includes at least two longitudinal sections, which are joined together to form a shared longitudinal structure by having the longitudinal sections at least partially overlap each other in an overlap region. One of the longitudinal sections of the frame has a side panel, which in the overlap region exhibits a connecting section for attachment to a floor panel, and the other longitudinal section exhibits a counter-panel in the overlap region that at least partially abuts against the side panel. The abutment of the counter-panel against the side panel remains outside of the connecting section. The frame includes at least one longitudinal structure, and the longitudinal structure and at least one of the longitudinal sections together extend over a longitudinal section of the longitudinal frame.

17 Claims, 6 Drawing Sheets

(56) References Cited

U.S. PATENT DOCUMENTS 8,556,336 B2 * 10/2013 Yasuhara et al. ......... 296/193.07
8,636,314 B2 * 1/2014 Mildner et al. ............... 296/204

FOREIGN PATENT DOCUMENTS

| EP | 0646515 A1 | 4/1995 |
| JP | 2000255447 A | 9/2000 |

* cited by examiner

LONGITUDINAL FRAME FOR THE CHASSIS STRUCTURE OF A MOTOR VEHICLE

CROSS-REFERENCE TO RELATED APPLICATION

This application claims priority to German Patent Application No. 10 2011 117 682.2, filed Nov. 4, 2011, which is incorporated herein by reference in its entirety.

TECHNICAL FIELD

The present disclosure relates to a longitudinal frame for the chassis structure of a motor vehicle with at least two longitudinal sections, which are joined together to form a shared longitudinal structure by having the longitudinal sections at least partially overlap each other in an overlap region. The present disclosure further relates to a chassis structure for a motor vehicle.

BACKGROUND

Modern motor vehicles must satisfy future statutory provisions relating to carbon dioxide ($CO_2$) emissions. Therefore, emphasis in the development of future generations of vehicles is being placed on reducing vehicle weight. In reducing the weight of a vehicle, care must likewise be taken to ensure that legal requirements on passenger protection be satisfied. In order to sufficiently comply with these requirements on passenger protection despite the reduction in vehicle weight, attempts are being made to introduce further measures to reinforce the vehicle body.

Typically, the vehicle body of motor vehicles is often provided with a continuous frame structure. The front frame and rear frame of the vehicle body are here joined together by a so-called frame extension. The frame extension is usually arranged under the floor panel of the vehicle body, wherein the floor panel in turn comprises the floor structure in the region of the passenger cabin of the motor vehicle.

Such a frame structure usually exhibits two lateral longitudinal frames, which are joined together by means of one or more transverse structures. The frame extension of each longitudinal frame is ordinarily made up of at least two longitudinal sections, which are joined together to yield a shared longitudinal structure. To this end, the longitudinal sections at least partially overlap each other in an overlap region.

In order to also be able to satisfy the future stringent requirements on passenger protection, new developments of the frame structure for a vehicle body are being targeted at making the longitudinal sections, in particular the overlap region of the longitudinal sections, more resistant to a side impact of the motor vehicle. In addition, the frame structure is to be more resistant to a front impact of the motor vehicle, in particular in the area of the longitudinal sections and in the overlap region of the longitudinal sections, so as to further improve passenger protection.

Therefore, it may be desirable to provide a longitudinal frame for the chassis structure of a motor vehicle having the features specified at the outset, which withstands the high forces associated with a side impact of the motor vehicle better than before. Also, it may be desirable to provide a chassis structure for a motor vehicle that is suitable for the use of such a longitudinal frame. In addition, other objects, desirable features and characteristics will become apparent from the subsequent summary and detailed description, and the appended claims, taken in conjunction with the accompanying drawings and this background.

SUMMARY

A longitudinal frame according to the present disclosure for the chassis structure of a motor vehicle, in one example, for the chassis structure of a motor vehicle body, has at least two longitudinal sections, which are joined together to yield a shared longitudinal structure, in that the longitudinal sections at least partially overlap each other in an overlap region.

The overlap region can lie in the area of the floor panel of the motor vehicle or motor vehicle body. The longitudinal sections can each be extensions of the front frame and the rear frame of the motor vehicle or vehicle body.

The present disclosure provides that one of the longitudinal sections has a side panel, which in the overlap region exhibits a connecting section for attachment to a floor panel or another component of the vehicle body or motor vehicle, while the other longitudinal section exhibits a counter-panel in the overlap region that at least partially abuts against the side panel, wherein said abutment against the side panel remains outside of the connecting section.

This measure yields a connection between the longitudinal sections that utilizes relatively little material in the overlap region, since the counter-panel of the one longitudinal section extends only over an area of the side panel, so as to realize the overlap between the side panel and counter-panel. This already economizes on weight in the longitudinal frame according to the present disclosure by comparison to a longitudinal frame in which the longitudinal sections in the overlap region exhibit a substantially identical cross sectional shape, so that more material is required to form the counter-panel, since the counter-panel in this case extends up until the connecting section.

Having the counter-panel abut against the side panel only outside the connecting section of the side panel improves how forces are introduced given a side impact of the motor vehicle, since the connecting section fixes only one of the longitudinal sections to a floor panel or some other component of the vehicle body, as a result of which forces acting on the other longitudinal sections with the counter-panel abutting outside the connecting section precisely do not relay the forces that arise during a side impact to the floor panel or other component.

If the side impact only arises in the area of the longitudinal section with the counter-panel, for example, the impact forces precisely do not act directly on the connecting section, and hence on the floor panel secured thereto or any other vehicle components or body components, so that the floor panel, other body component or vehicle component is better protected against side impact forces in this case than given a counter-panel that has a design substantially corresponding to the side panel and extends up until into the connecting section. As a consequence, the longitudinal frame according to the present disclosure can withstand the high impact forces associated with a side impact better than before.

It makes sense for the counter-panel to follow the progression of the side panel, in one example, nestle against it, especially with the counter-panel passing over into the side panel. Realized as a result is a soft transition, which may help prevent the connection between the panel and counter-panel from being prematurely exposed to an excessive load in the event of an impact event. The side panel generally involves a side wall that is substantially perpendicular or vertical with the longitudinal frame built in. A side panel aligned in such a way with the longitudinal frame built in allows the side panel and counter-panel to absorb the lateral forces in play during a side impact.

An exemplary embodiment of the present disclosure provides that the overlap region extends in an oblong manner in the longitudinal direction of the longitudinal frame, in one example, with the side panel and counter-panel being joined together over the oblong extension by means of at least one, generally several welded, riveted, clinched and/or adhesive bonds. This results in an especially durable connection between the longitudinal sections.

Another exemplary embodiment of the present disclosure provides that one of the longitudinal sections or all longitudinal sections together exhibit an S-shaped progression in the longitudinal direction of the longitudinal frame, in one example, extending in the shape of an S. This causes the longitudinal frame to geometrically change over its longitudinal extension with a soft transition, thereby effectively counteracting a premature excessive load on the component given a side impact of the motor vehicle.

It makes sense for the S-shaped progression to span a plane that substantially lies parallel to the underbody of the motor vehicle with the longitudinal frame built into in the motor vehicle or the vehicle body. The plane generally lies substantially horizontal with the longitudinal frame built in. The S-shaped contour of the longitudinal frame extending in this plane realizes an expansion of the distance between two longitudinal frames built into the chassis structure in the area below the passenger cabin, making it possible in the area with the expanded distance between the longitudinal frames to realize an enlarged installation space for accommodating components, such as the tank, batteries, exhaust system, transmission shaft, along with any fuel and/or brake lines.

It further makes sense for the S-shaped progression to additionally span a plane that runs substantially vertically or at least at an inclination from the bottom up or from the top down with the longitudinal frame built into the motor vehicle or the vehicle body. As a consequence, the longitudinal sections can be used to bridge a height difference of the frame structure between the front frame and the frame below the underbody of the passenger cabin, in one example, using the longitudinal sections to establish a connection between the front frame and the frame sections arranged under the passenger cabin.

In addition, it makes sense for one of the longitudinal sections or all longitudinal sections together to exhibit an S-shaped progression in the longitudinal direction of the longitudinal frame, wherein the S-shape is elongated. This measure is also aimed at achieving as soft a transition as possible in the area of the geometric change in the longitudinal frame, so as to thereby counteract a premature excessive load on the component in the event of an impact event.

With the longitudinal frame built into the motor vehicle or vehicle body, the S-shape can extend over a receiving area for a front wheel. With the longitudinal frame built into the motor vehicle or vehicle body, the longitudinal section pointing toward the back viewed in the forward traveling direction can substantially be spaced the same distance apart from a side panel of an adjacent rocker panel structure.

Additionally or alternatively to the longitudinal frame of the kind described above, a longitudinal frame according to the present disclosure has at least two longitudinal sections for the chassis structure of a motor vehicle, which are joined together to form a shared longitudinal structure, by virtue of the fact that the longitudinal sections at least partially overlap in an overlap region, and according to the present disclosure also has at least one longitudinal structure, so that the longitudinal structure and at least one of the longitudinal sections together extend over a longitudinal section of the longitudinal frame.

This makes the longitudinal frame more resistant to a side impact of the motor vehicle, since the longitudinal structure acts as an additional stabilizing structure or reinforcing structure for the at least one of the longitudinal sections, so that over at least the longitudinal section over which the longitudinal structure and at least one longitudinal section together extend. As a consequence, the longitudinal frame according to the present disclosure counteracts the high impact forces encountered during a side impact, which ultimately improves passenger protection during a side impact of the motor vehicle.

It makes sense for the longitudinal structure to be used for attachment to a rocker panel structure. This optimizes load introduction in the event of an impact event, in one example, during a side impact of the motor vehicle.

For this purpose, the longitudinal extension of the longitudinal structure should generally be designed so that it can be secured to the rocker panel structure.

Furthermore, the longitudinal structure should generally run substantially parallel to the rocker panel structure, so that a generally good attachment can be realized between the longitudinal structure and rocker panel structure.

It also makes sense for a longitudinal end of the longitudinal structure to be fastened to at least one of the longitudinal sections. This yields a generally stable bond, which counteracts the arising impact forces during a side impact.

The longitudinal structure should generally be connected to at least one of the longitudinal sections in the overlap region. As a result, the longitudinal structure additionally reinforces the overlap region where the longitudinal sections are joined together via overlapping, so as to effectively counteract a premature excessive load on the component during a side impact.

The longitudinal structure should advantageously extend in the longitudinal direction of the longitudinal frame at least up until the connecting area for a bulkhead or transverse structure, and/or extend at least up until into the area situated inside or adjacent to the front wheel casing of the motor vehicle with the longitudinal frame built into the motor vehicle. As a consequence, the longitudinal structure provides additional support to the front wheel in the event of a frontal impact. This also yields a generally effective reinforcement, which can start from the rear frame of the vehicle body and run until up to the front bulkhead of the vehicle body. In this regard, the measure is aimed at optimally introducing the impact energy from a laterally offset collision of the vehicle into the body structure, and distributing it to prescribed load paths in a targeted manner.

An especially stable longitudinal structure is realized according to an exemplary embodiment of the present disclosure by designing the longitudinal structure as an L-shaped profile, whose one L-shaped leg is joined to a side panel of one of the longitudinal sections, and in one example, nestles against the side panel. In this way, the L-shaped leg forms a wall that adjoins the side panel, which can be optimally secured to the side panel of one of the longitudinal sections.

The wall of the longitudinal structure formed by the leg can be connected to the side panel of one of the longitudinal sections in a technically simple manner, with the generation of a welded, clinched, riveted and/or adhesive bond.

Another exemplary embodiment of the present disclosure provides that at least one of the longitudinal sections exhibit at least one material segment that protrudes laterally outward or inward, which is used for attachment to at least one transverse structure, a floor panel, a rocker panel structure or similar body component. This enables a simple assembly of the body component with the longitudinal sections of the longitudinal frame, since at least one material segment is provided on the at least one of the longitudinal sections serving as a flange. The material segment can be used to connect the body components to the at least one longitudinal section, e.g., by means of a welded, clinched, riveted and/or adhesive bond.

The same direction is pursued by a measure in which the longitudinal structure exhibits at least one material segment that protrudes laterally outward or inward, which is used for attachment to at least one transverse structure, a floor panel, a rocker panel structure or similar body component.

Another exemplary embodiment of the present disclosure provides that the longitudinal frame exhibit a front frame and rear frame, between which lie the longitudinal sections in the longitudinal direction of the longitudinal frame. As a result, the longitudinal sections can be used as an extension of the front frame or rear frame, thereby forming a continuous frame structure from the front frame up until into the rear frame of the motor vehicle or vehicle body. As a consequence, the frame structure produces a high reinforcement effect for the vehicle body, so that even if measures are introduced to reduce the weight of the vehicle body, e.g., by economizing on materials, the vehicle body will satisfy the stringent legal requirements on passenger protection.

Therefore, the longitudinal sections can take the form of an extension of the front frame or rear frame. In addition, the longitudinal sections can comprise the front frame and/or rear frame itself.

In another one of various aspects, the present disclosure encompasses a chassis structure for a motor vehicle, which exhibits one, generally two longitudinal frames of the kind described above.

It makes sense for the longitudinal frames of the chassis structure to be joined together via at least one transverse structure, wherein the transverse structure is arranged in the area of least distance between the longitudinal frames. This imparts a strong reinforcing effect to the chassis structure. Because the transverse structure is arranged in the area of least distance between the longitudinal frames, the installation space in the area between the longitudinal frames where the longitudinal frames are separated by a greater distance is free of the transverse structure, and thus open to accommodate components of the motor vehicle, such as the tank, the exhaust, any fuel and/or brake lines and other vehicle components that require a relatively large amount of installation space.

It further makes sense that the longitudinal structure of the respective longitudinal frame be joined, generally by means of an intermediate structure, with the longitudinal section of the accompanying longitudinal frame that is connected to the transverse structure.

Generally, using an intermediate structure or the intermediate structure, the longitudinal structure of the respective longitudinal frame is advantageously joined with the longitudinal section of the accompanying longitudinal frame connected to the transverse structure in such a way that the transverse structure and intermediate structure form a shared transverse connection between the longitudinal structures, with the interspersion of the respective one longitudinal section. This yields a generally stable frame structure in the area of the front wheel, which counteracts the impact forces arising during a frontal side impact of the motor vehicle in a generally stable manner, so that the impact energy is optimally introduced into the body structure.

An exemplary embodiment of the chassis structure provides that the longitudinal section of the respective longitudinal frame running toward the back as viewed in the forward traveling direction is connected with a respective lateral rocker panel structure.

The respective rocker panel structure can be connected with the longitudinal structure of the longitudinal frame.

The respective rocker panel structure can also be connected with a floor panel of the motor vehicle.

By connecting the rocker panel structure with the at least one portion of the longitudinal frame, additional measures have been taken to create a chassis structure that allows the motor vehicle to offer a high degree of passenger protection.

The present disclosure makes it possible to realize a frame structure for a motor vehicle that is relatively lightweight. The present disclosure also keeps the costs associated with fabricating the frame structure relatively low. Furthermore, the present disclosure enables the realization of a frame structure for a motor vehicle, which is improved in relation to the previous frame structures during a frontal and side impact of the motor vehicle. As a result of the present disclosure, the frame structure of the motor vehicle can provide more installation space for accommodating components of the motor vehicle, for example a tank, an exhaust, fuel and/or brake lines, under the floor structure.

Finally, the present disclosure also makes it possible to easily assemble a frame structure for a motor vehicle.

A person skilled in the art can gather other characteristics and advantages of the disclosure from the following description of exemplary embodiments that refers to the attached drawings, wherein the described exemplary embodiments should not be interpreted in a restrictive sense.

BRIEF DESCRIPTION OF THE DRAWINGS

The various embodiments will hereinafter be described in conjunction with the following drawing figures, wherein like numerals denote like elements, and wherein.

DETAILED DESCRIPTION

The following detailed description is merely exemplary in nature and is not intended to limit the present disclosure or the application and uses of the present disclosure. Furthermore, there is no intention to be bound by any theory presented in the preceding background or the following detailed description.

Figure 1:
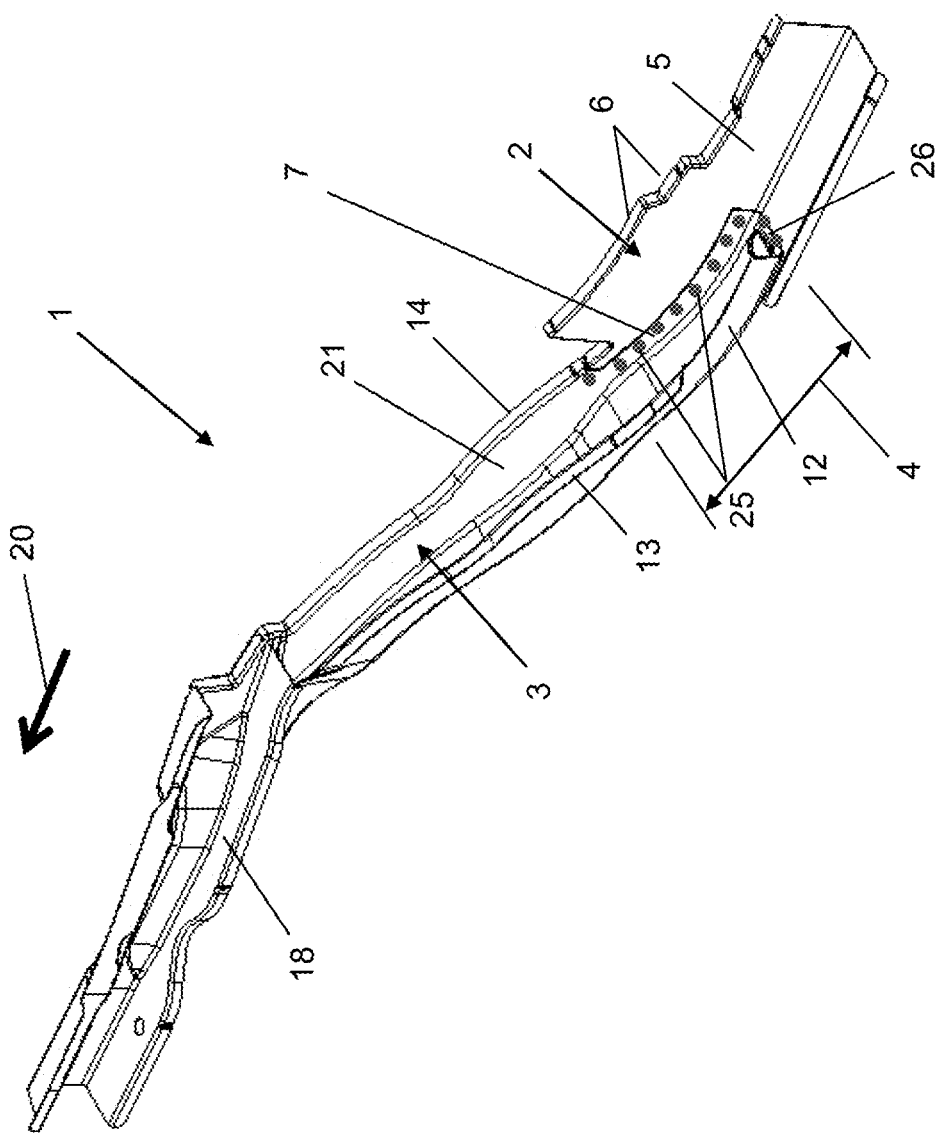
FIG. 1 is a perspective view of an exemplary embodiment for a longitudinal frame for the chassis structure of a motor vehicle.

FIG. 1 presents a schematic view of an exemplary embodiment for a longitudinal frame 1 for the chassis structure of a motor vehicle, in one example, the chassis structure of a vehicle body.

The longitudinal frame 1 exhibits two longitudinal sections 2 and 3, which are joined together to form a shared longitudinal structure by having the longitudinal sections 2 and 3 overlap in an overlap region 4.

The longitudinal frame 1 generally exhibits a front frame 18, which adjoins the front longitudinal section 3 viewed in the forward traveling direction 20, and in one example, is connected with the longitudinal section 3. The front frame 18 generally extends until into the front area of the vehicle body, which lies in front of the passenger cabin viewed in the forward traveling direction 20, and can form the engine compartment.

As a consequence, section 3 forms the extension of the front frame 18.

Generally, starting at the front frame 18 and extending until roughly into the overlap region 4, the longitudinal section 3 exhibits a substantially S-shaped progression for connection to the longitudinal section 2. The S-shaped basic contour of the section 2 is generally elongated, and nestles against the longitudinal section 2 along a receptacle or area for the front wheel (not shown on FIG. 1) of the motor vehicle up until the overlap region 4.

For example, the longitudinal section 2 can be designed with an L-shaped cross section, and exhibit a side panel 5, e.g., which lies substantially perpendicular with the longitudinal frame 1 built into the motor vehicle. The outer end of the side panel 5 extending in the longitudinal direction generally has a connecting section 6 for attachment to a floor panel (not shown on FIG. 1) of the vehicle body.

The longitudinal section 3 also exhibits a side panel 21, which substantially lies perpendicular with the longitudinal frame 1 built into the vehicle body. In the overlap region 4 of the longitudinal section 3, the side panel 21 in conjunction with the longitudinal section 2 forms a counter-panel 7, which abuts against the side panel 5 of the section 2, in one example, becoming nestled against the side panel 5 of the longitudinal section 2, wherein the counter-panel 7 remains abutted against the side panel 5 outside of the connecting section 6 of the longitudinal section 2.

Therefore, the longitudinal sections 2 and 3 are joined together in such a way that the side panel 21 of the longitudinal section 3 substantially traces the progression of the side panel 5 of the longitudinal section 2.

The longitudinal section 3 is generally designed with a U-shaped cross section at least in the overlap region 4, and exhibits a side panel 12 that is arranged opposite the counter-panel 7, and is joined with the counter-panel 7 by way of another panel 26 that forms the profile base of the longitudinal section 3.

The longitudinal sections 2 and 3 are generally rigidly interconnected in the overlap region 4 by means of at least one, generally several structural connections 25 on the counter-panel 7 of the longitudinal section 3 and the side panel 5 of the longitudinal section 2. Structural connections 25 can also act to fix the longitudinal section 2 in place in the area of the other panel 26 of the longitudinal section 3.

The side panel 12 of the longitudinal section 3 generally extends up until over the overlap region 4 up to the front frame 18, and its oblong end at least partially exhibits a material segment 13 that projects laterally outward, which in conjunction with a material segment 14 of the side panel 21 is designed as a flange, so as to accommodate a floor panel (not shown on FIG. 1) of the vehicle body or any transverse structures (not shown on FIG. 1) or other structures.

Figure 2:
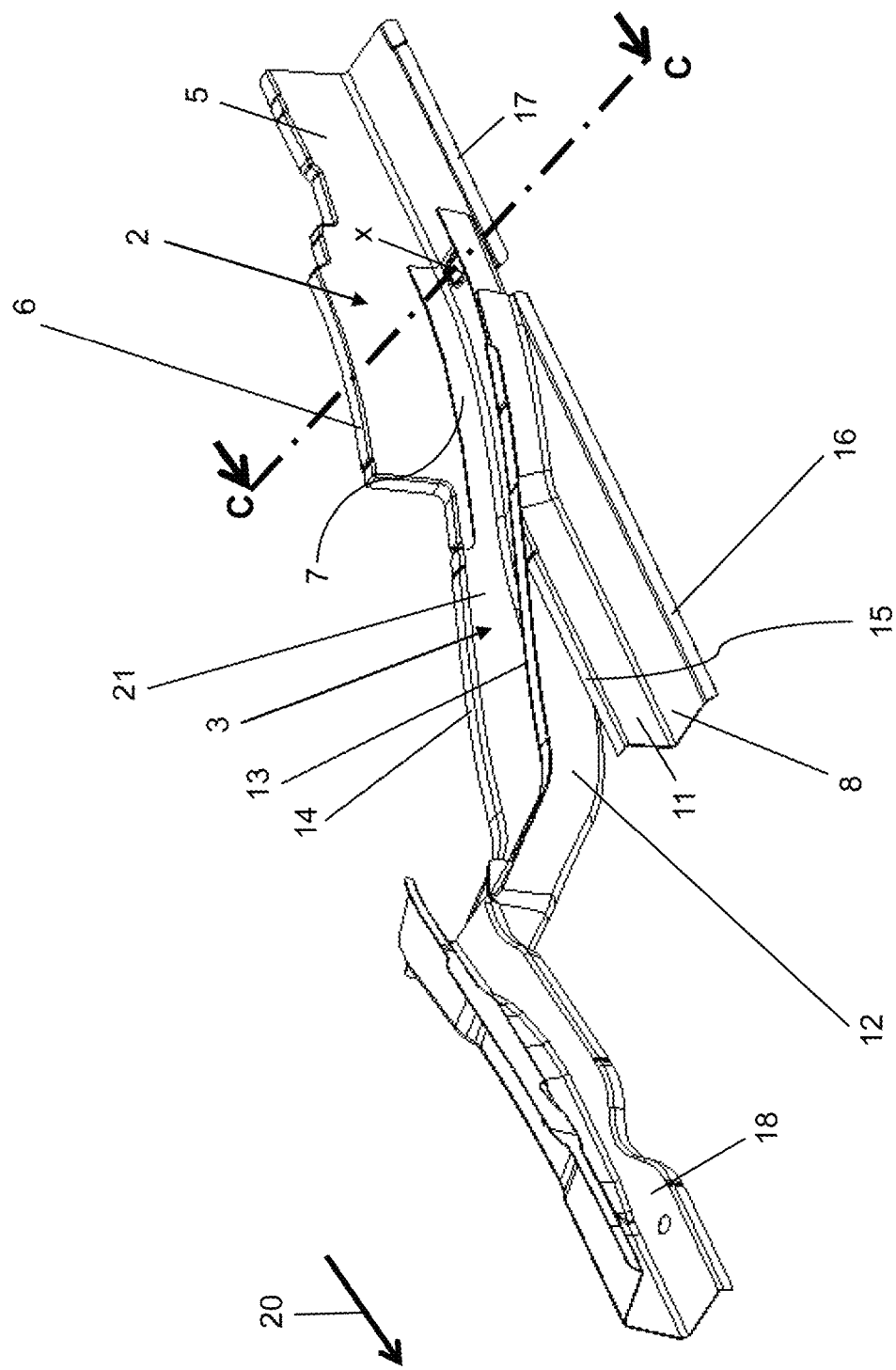
FIG. 2 is a perspective view of the longitudinal frame according to FIG. 1 with an additional longitudinal profile mounted thereto.

FIG. 2 shows the longitudinal frame 1 according to FIG. 1 in another exemplary embodiment. As evident from FIG. 2, a longitudinal structure 8 is arranged on the longitudinal frame 1 as an additional longitudinal profile, so that the longitudinal structure 8 and at least one of the longitudinal sections 2, 3 of the longitudinal frame 1 jointly extend over a longitudinal section of the longitudinal frame 1.

As further evident from FIG. 2, one longitudinal end of the longitudinal structure 8 is joined with the longitudinal section 3 in the overlap region 4. To this end, the longitudinal structure 8 can be connected with the longitudinal section 3 via at least one welded, riveted, clinched and/or adhesive bond.

The longitudinal structure 8 generally exhibits an L-shaped profile, which has an L-shaped cross section, whose one leg 11 with the L-shape is nestled against the side panel 12 of the longitudinal section 3, in one example, joined thereto.

The oblong ends of the longitudinal structure 8 each exhibit a material segment 15 or 16 that projects laterally outward, which is used for connection to transverse structures (not depicted on FIG. 2), a floor panel or a rocker panel structure. The material segment 16 is here the elongation of a material segment 17 of the longitudinal section 2, which in conjunction with the material segment 16 forms a shared flange.

Figure 3:
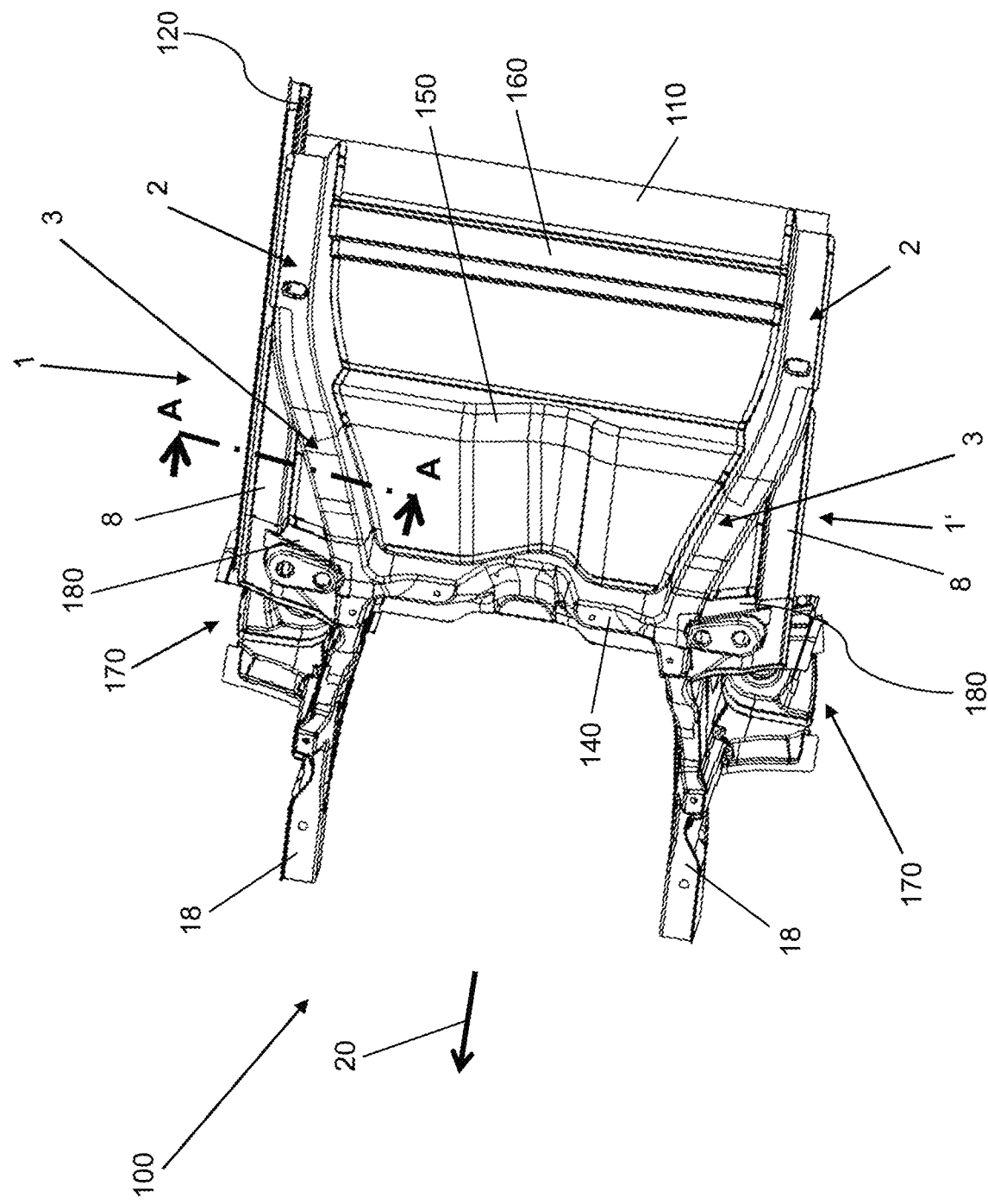
FIG. 3 is a perspective view from below of an exemplary embodiment of a chassis structure for a motor vehicle with a longitudinal frame according to FIG. 2.

FIG. 3 presents a schematic view of another exemplary embodiment of a chassis structure 100 for a motor vehicle or vehicle body. The chassis structure 100 exhibits the longitudinal frame 1 according to FIG. 2. Spaced apart from the longitudinal frame 1 is a longitudinal frame 1', which in terms of its features is designed mirror symmetrically in the direction of the longitudinal axis of the vehicle, and substantially exhibits all features of longitudinal frame 1.

As evident from FIG. 3, the longitudinal frames 1 and 1' are connected with each other by at least one, generally several transverse structures 140, 150 and 160. The transverse structure 140 here generally comprises the transverse structure upon which the vehicle bulkhead is arranged, or which comprises the vehicle bulkhead. The transverse structure 140 joins the longitudinal frames 1, 1' together in the area of least distance between the longitudinal frames 1, 1'.

As especially evident from FIG. 3, the S-shaped progression of the longitudinal frames 1, 1' expands the distance between the longitudinal frames 1, 1' proceeding from the transverse structure 140 as viewed opposite the forward traveling direction 20, so that more space is made available in this area between the longitudinal frames 1, 1' so as to be able to accommodate components used in assembling the vehicle, e.g., the tank, the exhaust, any fuel or brake lines.

The area expanded by the S-shaped progression of the longitudinal frames 1, 1' forms substantially underneath the passenger cabin. At least one floor panel 110 is arranged on the longitudinal frames 1, 1' in this area. The floor panel generally lies on the longitudinal frame 1, 1'.

As further evident from FIG. 3, the longitudinal structure 8 of the respective longitudinal frame 1 or 1' is connected by means of an intermediate structure 180 to the longitudinal section 3 of the accompanying longitudinal frame 1 or 1' joined with the transverse structure 140. The connection is generally configured in such a way that the respective transverse structure 140 and intermediate structure 180 generate a shared transverse connection between the longitudinal structures 8 of the respective longitudinal frame 1 or 1', with the interspersion of the respective longitudinal section 3.

This transverse structure running from the longitudinal structure 8 of the one longitudinal frame 1 to the longitudinal structure 8 of the other longitudinal frame 1' is generally situated in the area of the front wheel casing 170, so that the impact force arising given a laterally offset impact of the vehicle is optimally introduced into the chassis structure 100 of the vehicle body.

Exemplarily presented by FIG. 3 on the longitudinal frame 1 is a lateral rocker panel structure 120, which is secured to the longitudinal structure 8 and longitudinal section 2.

Figure 4:
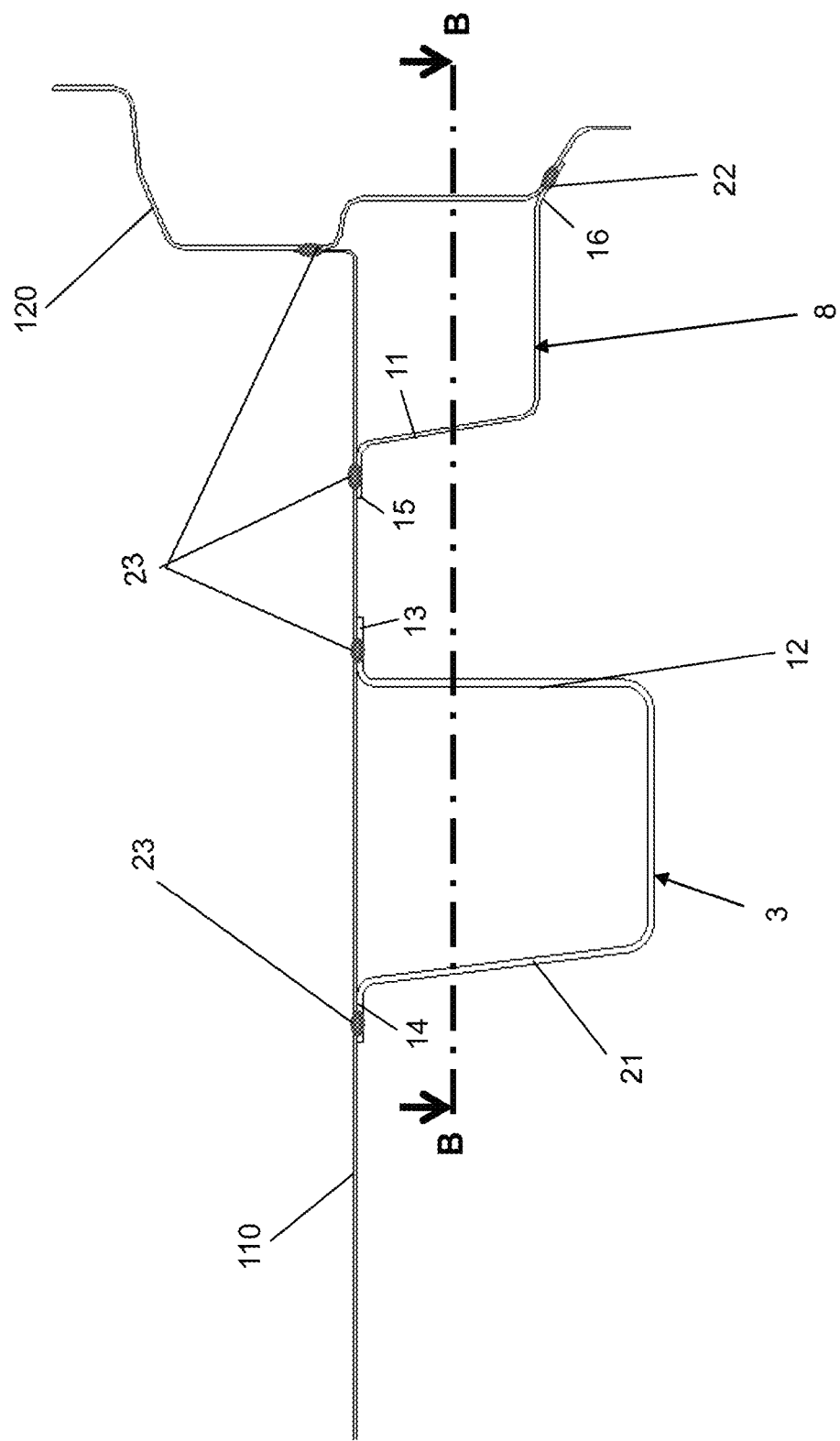
FIG. 4 is a sectional view of the longitudinal frame according to FIG. 2 along cutting line A-A on FIG. 3.

In an exemplary sectional view along the cutting line A-A on FIG. 3, FIG. 4 shows the design of the substructure 100 with the rocker panel structure 120 situated laterally thereupon.

For example, the longitudinal structure 8, a section of the floor panel 110 and the lateral rocker panel structure 120 create a profile having a closed cross section that extends in the longitudinal direction of the longitudinal frame 1.

Further, the U-shaped profile of the longitudinal section 3 and the floor panel 110 generate another contour having a closed cross section, which extends at least over one section in the longitudinal direction of the longitudinal frame 1. The laterally outwardly placed material segments 13 and 14 of the longitudinal section are fixed in place on the floor panel 110 by means of structural connections.

The laterally outwardly positioned material segments 15 and 16 of the longitudinal structure 8 are joined with the floor panel 110 on the one hand and the rocker panel structure 120 on the other, wherein the rocker panel structure 120 is in turn structurally attached to the floor panel 110. Structural connections 22 or 23 are provided for this purpose.

The structural connections 22 and 23 can be generated by at least one welded, riveted, clinched and/or adhesive bond.

Figure 5:
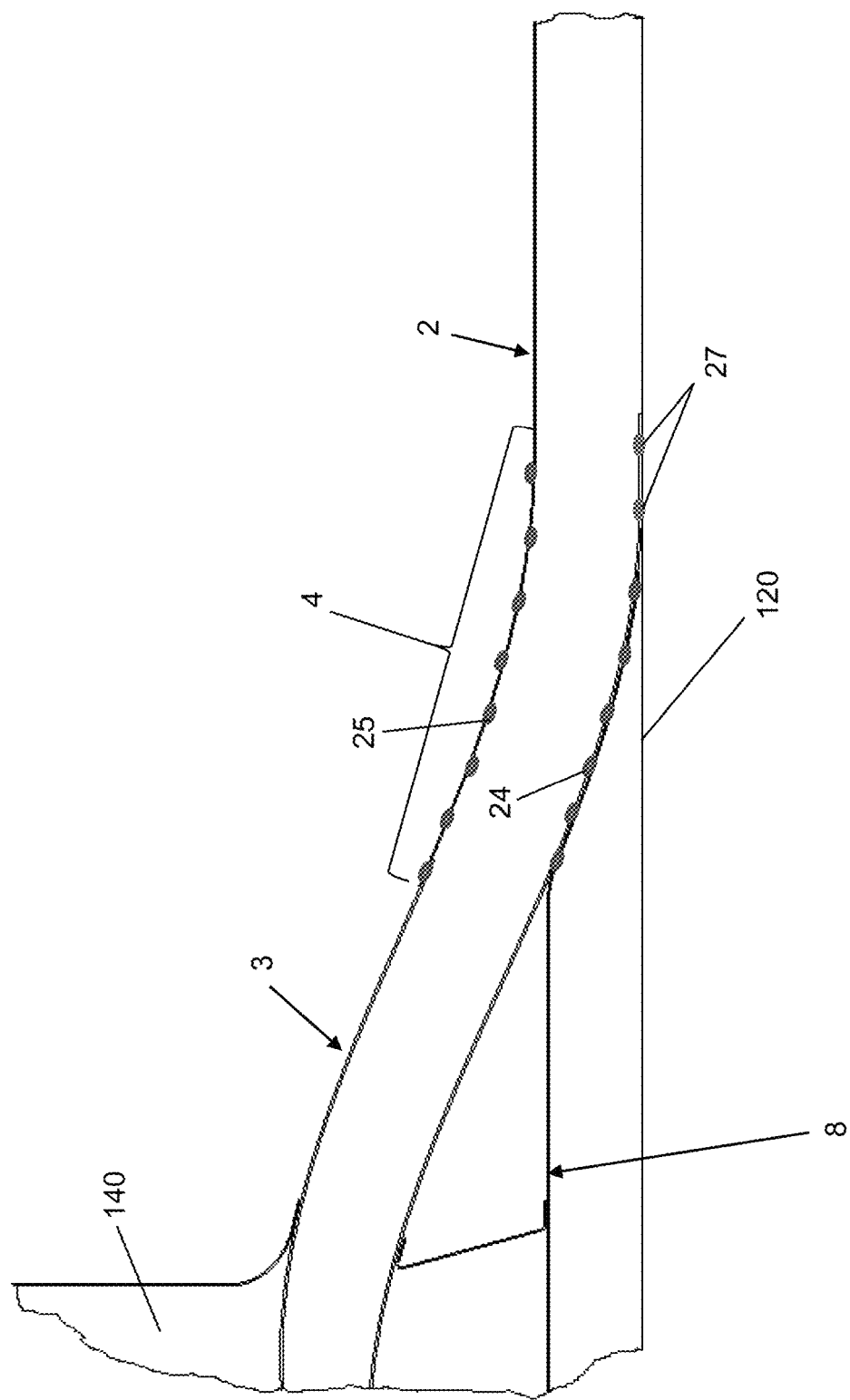
FIG. 5 is a sectional view of the longitudinal frame according to FIG. 2 along cutting line B-B on FIG. 4.

FIG. 5 presents another sectional view of the area of the chassis structure 100 shown on FIG. 4 along the cutting line B-B on FIG. 4.

As evident from FIG. 5, the longitudinal section 3 exhibits an S-shaped progression, which passes over into the longitudinal section 2, wherein the S-shaped progression is elongated, and nestles against the progression of the longitudinal structure 8. The longitudinal structure 8 and longitudinal section 2 are here designed in such a way by means of their material segments 15 and 17, which serve as a flange for attaching the rocker panel structure 120 (see FIG. 2), as to generate a structure that is substantially flush in the longitudinal direction, against which the rocker panel structure 120 flatly abuts over its longitudinal extension.

FIG. 5 shows the at least one structural connection, which serves to join the side panel 5 of the longitudinal section 2 with the counter-panel 7 of the longitudinal section 3 (see FIG. 1). As further evident from FIG. 5, additional structural connections 24 are provided for joining the longitudinal structure 8 with the side panel 12 of the longitudinal section 3.

Additional structural connections 27 are provided for attaching the rocker panel structure 120 to the material segment 17 of the longitudinal section 2 (see FIG. 2).

All structural connections can be established by at least one welded, riveted, clinched and/or adhesive bond.

Figure 6:
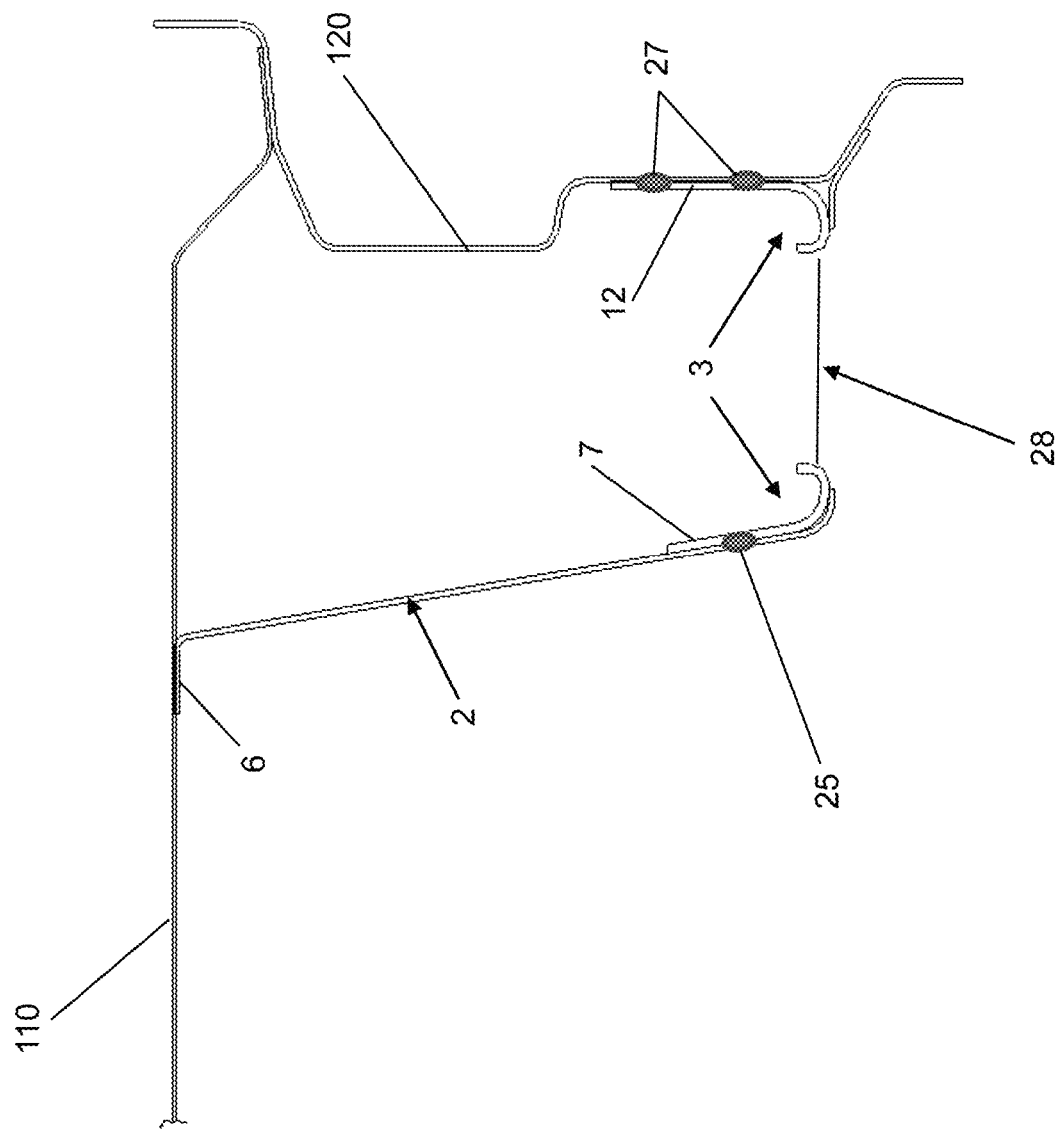
FIG. 6 is a sectional view of the longitudinal frame according to FIG. 2 along cutting line C-C on FIG. 2.

In a sectional view along the cutting line C-C on FIG. 2, FIG. 6 shows the chassis structure 100 in the area of the longitudinal frame 1, specifically in the overlap region 4 of the longitudinal section 2 and longitudinal section 3. The counter-panel 7 of the longitudinal section 3 and the side panel 5 of the longitudinal section 2 are joined together by means of the structural connection 25.

The side panel 12 of the longitudinal section 3 is joined with the rocker panel structure 120 by means of the structural connection 27. The respective floor walls of the longitudinal section 2 and longitudinal section 3 exhibit through openings 28, which are substantially congruent to each other with the longitudinal section 2 and longitudinal section 3 joined together, thereby creating access from outside into the hollow space formed by the side panel 5 of the floor panel 110, the rocker panel structure 120 and the floor walls, for example so as to in this way be able to establish the structural connections 27 and/or 25.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the present disclosure in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the present disclosure as set forth in the appended claims and their legal equivalents.

What is claimed is:

1. A longitudinal frame for the chassis structure of a motor vehicle, comprising:
   at least two longitudinal sections that are joined together in direct contact with each other in a longitudinal direction of the longitudinal frame to form a shared longitudinal structure by having the at least two longitudinal sections at least partially overlap each other in an overlap region,
   wherein one of the at least two longitudinal sections has a side panel, which in the overlap region exhibits a connecting section for attachment to at least one of a floor panel, another component of the vehicle body and the motor vehicle, and the other of the at least two longitudinal sections exhibits a counter-panel in the overlap region that at least partially abuts against the side panel, and the abutment against the side panel remains outside of the connecting section.

2. The longitudinal frame according to claim 1, wherein the overlap region extends in an oblong manner in the longitudinal direction of the longitudinal frame.

3. The longitudinal frame according to claim 1, wherein the overlap region extends in the longitudinal direction so that the side panel and counter-panel are joined together over the oblong extension of the overlap region by at least one welded, riveted, clinched, and adhesive bond.

4. The longitudinal frame according to claim 1, wherein at least one of the at least two longitudinal sections exhibits an S-shaped progression in the longitudinal direction of the longitudinal frame.

5. The longitudinal frame according to claim 4, wherein the S-shaped progression spans a plane that substantially lies parallel to the underbody of the motor vehicle with the longitudinal frame built into the motor vehicle.

6. A longitudinal frame for the chassis structure of a motor vehicle, comprising:
   at least two longitudinal sections that are joined together in direct contact with each other in a longitudinal direction of the longitudinal frame to form a shared longitudinal structure by having the at least two longitudinal sections at least partially overlap each other in an overlap region,
   wherein at least one longitudinal structure is provided, so that the at least one longitudinal structure and at least one of the at least two longitudinal sections together extend over a longitudinal section of the longitudinal frame, and
   wherein the longitudinal frame exhibits a front frame and a rear frame, between which lie the at least two longitudinal sections in the longitudinal direction of the longitudinal frame.

7. The longitudinal frame according to claim 6, wherein the at least one longitudinal structure is used for attachment to a rocker panel structure.

8. The longitudinal frame according to claim 7, wherein a longitudinal extension of the at least one longitudinal structure is secured to the rocker panel structure.

9. The longitudinal frame according to claim 6, wherein one longitudinal end of the at least one longitudinal structure is fastened to at least one of the at least two longitudinal sections in the overlap region.

10. The longitudinal frame according to claim 6, wherein the at least one longitudinal structure extends in a longitudinal direction of the longitudinal frame at least up until a connecting area for a bulkhead or transverse structure.

11. The longitudinal frame according to claim 6, wherein the at least one longitudinal structure extends in a longitudinal direction of the longitudinal frame at least up until into an area situated inside or adjacent to a front wheel casing of the motor vehicle with the longitudinal frame built in.

12. The longitudinal frame according to claim 6, wherein the at least one longitudinal structure is designed as an L-shaped profile, whose one L-shaped leg is joined to a side panel of one of the at least two longitudinal sections so as to nestle against the side panel.

13. The longitudinal frame according to claim 6, wherein at least one of the at least two longitudinal sections exhibits at least one material segment that protrudes laterally outward or inward, which is used for attachment to at least one of a transverse structure, a floor panel, a rocker panel structure and body component of the motor vehicle.

14. The longitudinal frame according to claim 6, wherein the longitudinal structure exhibits at least one material segment that protrudes laterally outward or inward, which is used for attachment to at least one of a transverse structure, a floor panel, a rocker panel structure and body component of the motor vehicle.

15. A chassis structure for a motor vehicle, comprising:
at least two longitudinal frames each including at least two longitudinal sections that are joined together in direct contact with each other in a longitudinal direction of the at least two longitudinal frames to form a shared longitudinal structure by having the at least two longitudinal sections at least partially overlap each other in an overlap region and at least one longitudinal structure,
wherein the at least one longitudinal structure and at least one of the at least two longitudinal sections together extend over a longitudinal section of each of the at least two longitudinal frames, and
wherein each of the at least two longitudinal frames exhibits a front frame and a rear frame, between which lie the at least two longitudinal sections in the longitudinal direction.

16. The chassis structure according to claim 15, wherein the at least two longitudinal frames are joined together via at least one transverse structure, and the transverse structure is arranged in the area of least distance between the at least two longitudinal frames.

17. The chassis structure according to claim 15, wherein one of the at least two longitudinal sections of a respective one of the at least two longitudinal frames running toward the back as viewed in the forward traveling direction is connected with a respective lateral rocker panel structure.

\* \* \* \* \*